United States Patent Office 3,294,037
Patented Dec. 27, 1966

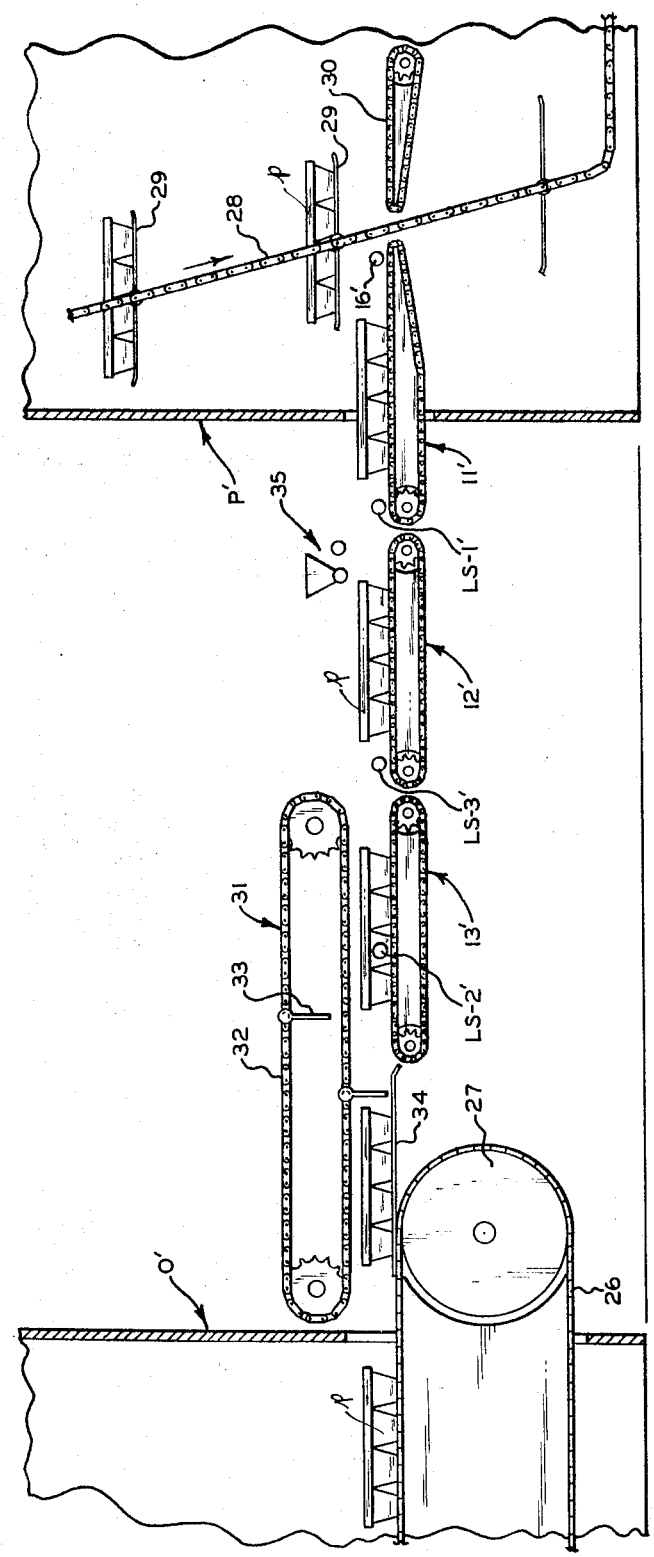

3,294,037
CONVEYOR SYSTEM
Dale H. Hoag and Peter H. Valentyne, Saginaw, Mich., assignors to Baker Perkins Inc., Saginaw, Mich., a corporation of New York
Filed Nov. 12, 1963, Ser. No. 322,735
13 Claims. (Cl. 107—4)

This invention relates to conveyor systems and more particularly to interrelated conveyor mechanisms for use in transferring products such as pansets of proofed dough, which must be very gently handled, from one processing unit to another. Systems constructed in accordance with the present invention are employed to transfer pansets of proofed bread dough between the proofer and the oven, to transfer pansets of proofed roll dough from the proofer to the oven, and to transfer pansets of baked rolls from the oven to a cooler. Modern day bakeries are installing continuous dough mixing equipment which not only provides a very tender dough but also increases considerably the rate of production in the bakery and the rate of travel of the product to and through the various processing units. If pan stops are used in the bakery processing system, the greater speed of travel of the pansets means that the impact shock which is transmitted when the pansets engage the stops, or one another, is also considerably increased. In the present system, the use of conventional pan stops is avoided after the pansets of dough leave the proofer to insure that the pansets will not thereafter be stopped in an abrupt manner to transfer shocks to the dough which would deflate it.

Briefly, the invention is concerned with grouping means which provides either a full complement or full group of pansets to each tray or shelf of the proofer or no pans at all, a series of electrically interrelated endless conveyors in end-to-end disposition which are started and stopped to transfer pansets of dough in groups in accordance with the presence or absence of a group of pansets at the conveyor immediately ahead along the line of transfer, the interrelated conveyors forming a so-called "step feed" system wherein each group of pansets is moved in smoothly flowing steps along the transfer path to the unit which is being supplied.

One of the prime objects of the invention is to avoid the use of an oven grouping conveyor and its associated pan stops while providing a system which is just as flexible and versatile as prior art systems and provides an adequate supply of pansets to fill the oven trays.

A further object of the invention is to provide a system which operates on a full complement loading principle in the sense that the proofer grouping conveyor will not release a group of pansets until enough have accumulated to fill a shelf or tray of the proofer. In the present system, the number of pansets loaded on each proofer shelf or tray is always the same as the number loaded on the oven trays or hearth, and the steps between the proofer and oven provide sufficient storage so that the oven trays are under normal conditions always loaded with the product.

A further object of the invention is to provide a system which compensates for empty proofer trays, should the rate of supply of pans to the proofer be subnormal.

A further object of the invention is to provide a system of the character described which permits lidding of the pans and separates them to facilitate the lidding operation.

Still another object of the invention is to provide a system in which the pansets are regrouped and respaced, before being loaded on an oven or cooler tray, to insure an even spacing which promotes a uniform bake or cooling cycle.

Another object of the invention is to provide a system which is well suited to high capacity plants and is capable of handling the high speed production rates encountered.

Other objects and advantages of the invention will be pointed out specifically or will become apparent from the following description when it is considered in conjunction with the appended claims and the accompanying drawings, in which:

FIGURE 1A is a fragmentary, schematic top plan view of the proofer loading conveyor;

FIGURE 3 is a schematic, side elevational view illustrating another embodiment of the system.

Figure 1:
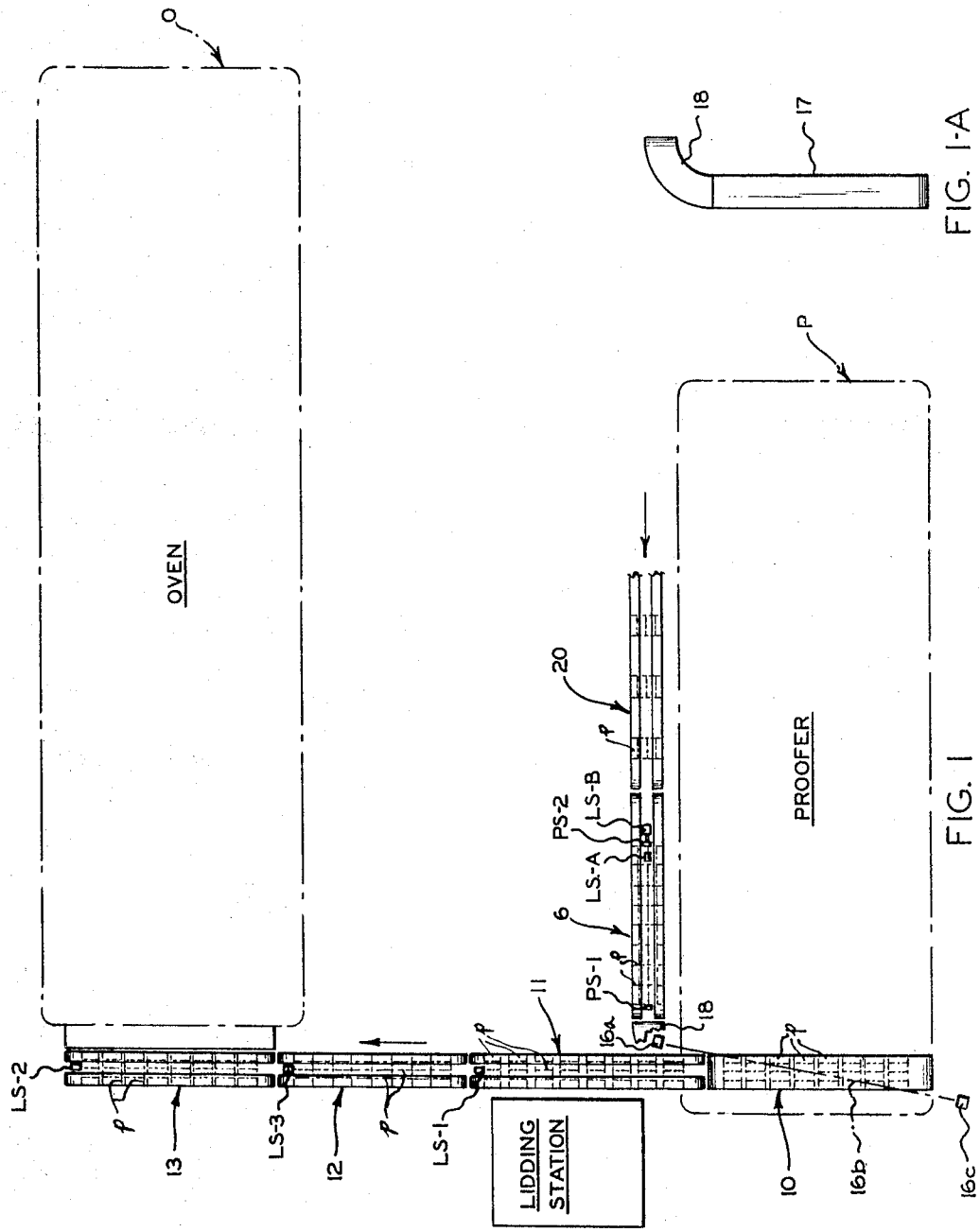
FIGURE 1 is a schematic, top plan view illustrating one form of system in which pans are supplied to a proofer and transferred to an oven.
Figure 2:
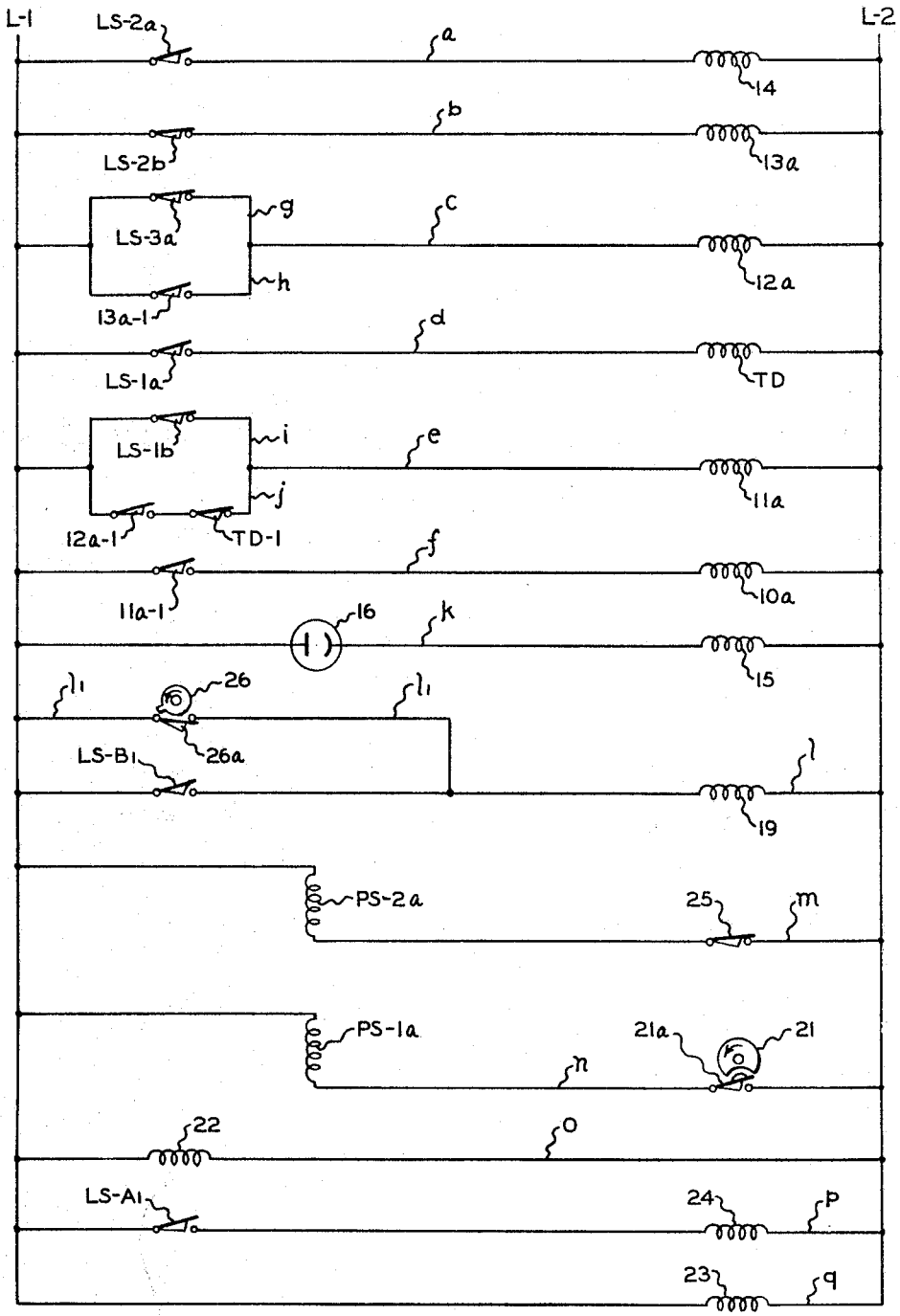
FIGURE 2 is a circuit diagram illustrating the operation of the system.

Referring now more particularly to the accompanying drawings and, in the first instance, to FIGURES 1, 1A and 2, a letter P generally indicates a proofer, which may be a rack type proofer of the type illustrated in United States Patents 2,823,811 and 2,931,483 or a tray type proofer of the type illustrated in United States Patent 3,101,143. The conveyor 10 shown in the drawings is the proofer discharge conveyor which receives the pansets $p$ of proofed dough from the racks or trays of the proofer in groups and transfers them to a similar in-line conveyor 11. The conveyor 11 transfers the pansets $p$ to a conveyor 12 which in turn transfers them to the oven supply conveyor 13. It will be noted that the conveyors 10–13 are of substantially equal length and constitute steps along the transfer path to the oven O. The conveyors 11–13 are preferably so-called table top conveyors employing a pair of spaced apart runs of hingedly connected plates which constitute a conveyor surface. The conveyor 10 may be a conventional belt conveyor or could be of the same type as conveyors 11–13. Table top conveyors are well known and are illustrated in United States Patent 1,966,659.

For purposes of convenience, it will be assumed that the oven O is a traveling, tray type oven and that a sweep type loader of the type shown in United States Patent 2,980,038 transfers pansets $p$ from the conveyor 13 which leads in opposite the end of the oven to the trays of the oven conveyor. Each of the conveyors 10–13 is preferably driven by a separate electric motor of conventional type and these motors are represented in the electrical control diagram shown in FIGURE 2 by the numerals 10a–13a, respectively, which designate the starting coils of the motors. Also incorporated in the circuit shown in FIGURE 2 is the starting coil 14 of the motor driving the oven loader mechanism and the starting coil 15 of the motor driving the proofer unloading member.

The motor coil 14 is shown connected in a circuit line $a$ which bridges line wires L–1 and L–2 and the motor coil 13a is connected in a similar wire $b$. The motor coil 12a is connected in a wire $c$. A wire $d$ also bridges the lines L–1 and L–2 and includes the coil TD of a conventional time delay relay, as shown. Connected in the circuit line $e$ is motor coil 11a and connected in the circuit line $f$ is motor coil 10a. It is to be understood that the coils 10a–13a, and 14 could also be electrically operated clutch coils which, when energized, would selectively drive the various units described from a drive system powered by a single, large electric motor.

As shown in FIGURE 1, a limit switch LS–1 is located at the front end of conveyor 11 between the runs thereof, a limit switch LS–3 is located at the front end of conveyor 12 between the runs thereof and a limit switch LS–2 is located at the front end of conveyor 13 between the runs thereof. These limit switches are of conventional type and include depressible actuator paddles which are depressed by pansets passing over them. The normally open contacts LS-2a of limit switch LS-2, which are connected in line a, are closed when limit switch LS-2 is actuated by pans moving forwardly on the conveyor 13, and the normally closed contacts LS-2b thereof, which are connected in the circuit line b, are simultaneously opened when the limit switch LS-2 is actuated. Connected in circuit line c are a pair of parallel lines g and h, as shown, and the normally closed contacts LS-3a of limit switch LS-3 are connected in the circuit line g, as shown. Connected in circuit line h are normally open contacts 13a-1, which are associated with the motor coil 13a and close when the coil 13a is energized. In addition to the time delay relay coil TD of a conventional timer, circuit line d includes the normally open contacts LS-1a of limit switch LS-1, which are closed when pans reach the front end of conveyor 11 and limit switch LS-1 is actuated.

It will be seen that circuit line e incorporates a pair of parallel lines i and j. Connected in the line i are the normally closed contacts LS-1b of limit switch LS-1, and connected in circuit line j are the normally open contacts 12a-1, which are associated with motor coil 12a and are closed when coil 12a is energized. The normally closed time delay contacts TD-1, which are opened when time delay coil TD is energized, are also connected in line j. Provided in circuit line f are the normally open contacts 11a-1, which are closed when the motor coil 11a is energized.

Provided in a circuit line k is an electric eye or phototube 16 which controls the operation of the motor driving the proofer unloading element. In FIGURE 1 the phototube 16 is represented by a light source 16a which directs a light beam 16b at a cathode 16c.

Normally, a full complement of pansets is loaded to each rack shelf or tray of the proofer. If not enough pansets are in position to provide a full complement of pansets for a shelf or tray of the proofer, the grouping conveyor 6 shown in FIGURE 1 prevents any pans whatsoever from being loaded and that particular shelf or tray proceeds empty through the proofer. For purposes of convenience, it will be assumed that the proofer P is a rack type proofer and that it includes a loading conveyor 17 (see FIGURE 1A) of the type shown in United States Patents Nos. 2,823,811 or 2,931,483. Conveyor 17, which may be presumed to lead into the proofer above proofer discharge conveyor 10, may be connected with a 90° turn conveyor 18 and it may be assumed that a single motor drives conventional conveyors 17 and 18, which may be mechanically coupled by chains and sprockets or coupled in any suitable manner.

In the circuit diagram, FIGURE 2, additional circuit lines l-q spanning line wires L-1 and L-2 are provided and the motor driving the conveyors 17 and 18 is designated by its starting coil 19, which is connected in circuit line l. The grouping conveyor 6 supplies conveyor 18 and it is in turn supplied by a conveyor 20 connected with the dough mixing and panning unit. The conveyor 6 is preferably a table top conveyor of the same character as conveyors 11-13 and comprises spaced apart runs, as shown. Situated between the runs at the front end of the conveyor 6 is a pan stop PS-1, which is represented in the circuit diagram, FIGURE 2, by its actuating solenoid PS-1a in circuit line n. Also provided in circuit line n is a conventional cam operated limit switch whose cam 21 is driven by the motor driving conveyors 17 and 18 and whose spring returned, normally open contacts 21a are open except when closed by the cam 21. A similar cam operated switch having a cam 26 driven by the motor driving conveyors 17 and 18 has normally closed contacts 26a in circuit line l' which function to maintain the motor driving conveyors 17 and 18 in operation for the required period.

Situated at a predetermined distance behind pan stop PS-1 is a second pan stop PS-2 which is represented in the circuit diagram, FIGURE 2, by its actuating solenoid PS-2a in circuit line m. The circuit lines o and q are provided for the starting coils 22 and 23, respectively, of the motors which drive conveyors 6 and 20. Mounted immediately ahead of the adjustable pan stop PS-2 is a limit switch LS-A of the same character as the limit switches previously mentioned and it may be assumed for the sake of convenience that when 8 pansets are grouped behind the pan stop PS-1, the last panset will rest on and actuate the limit switch LS-A. The system, of course, can be set to supply groups in which a different number of pansets comprise a group. Also provided between the runs of the grouping conveyor 6 is a limit switch LS-B which is positioned to be actuated when the pan stop PS-2 rises. The limit switch LS-A has normally open contacts LS-A1 in circuit line p, and the limit switch LS-B has normally open contacts LS-B1 in circuit line l. A timer relay of conventional type is provided which has a timer coil 24 in circuit line p and normally closed timer contacts 25 connected in circuit line m. The timer may be the timer model 9050-ROIE manufactured by Square D Company of Milwaukee, Wisconsin, U.S.A., wherein the time delay occurs before contacts 25 are opened.

It is to be understood that the pan stops PS-1 and PS-2 are conventional solenoid actuated pan stops which are in lowered position when their solenoids are energized and which are spring returned to "up" position when their solenoids are deenergized. With the pan stop PS-1 normally in raised position, a group of pansets will accumulate on the grouping conveyor 6 until enough have accumulated for the limit switch LS-A to be depressed. Switch contacts LS-A1 will be closed and timer coil 24 energized to open timer contacts 25 after a time delay. When timer contacts 25 open, solenoid PS-2a of pan stop PS-2 is deenergized so that pan stop PS-2 rises. As it rises it actuates limit switch LS-B, which closes the normally open contacts LS-B1 in line l and energizes the starting coil 19 of the motor driving conveyors 17 and 18. The conveyors 20 and 6, for purposes of this disclosure, may be assumed to be driven continuously. When the motor starting coil 19 is energized and the conveyors 17 and 18 are driven, the cam 21 is rotated and the contacts 21a are closed to energize the solenoid PS-1a in circuit line n so that the pan stop PS-1 is lowered and pansets are fed from the grouping conveyor 6 to the conveyor 18 and on to the conveyor 17. The coil 19 is maintained energized by the cam 26 permitting contacts 26a to close even though contacts LS-B1 open when the last panset of the group moves off limit switch LS-A and limit switch LS-B is deactuated by the lowering of pan stop PS-2. By the time the cam 21 has rotated sufficiently to again permit contacts 21a to open so that solenoid PS-1a is deenergized and the pan stop PS-1 is again raised, the requisite group of pansets has been fed onto the conveyor 17 in position to be loaded into the proofer P by the proofer loader element. During the time that the group pansets are being transferred to the conveyor 17, a second group of pansets has been proceeding from conveyor 20 onto grouping conveyor 6 and will be stopped by the pan stop PS-1 when it rises. Since it is necessary that timer 24 time out before pan stop PS-2 rises, normally open circuit m is unaffected by the pansets simply proceeding across limit switch LS-A forwardly toward the pan stop PS-1. The limit switch LS-A, while momentarily depressed by such pansets, does not open normally closed circuit line m until such time as the last panset of the designated group has depressed it for a time period greater than the timing period of the timer. Pan stop PS-2 remains in "up" position long enough to create a gap between the pan groups, and a timer (not illustrated) could be actuated by limit switch LS–B to create a gap of approximately twenty-four inches, if desired.

In the present case it will be assumed, for the sake of convenience, that a group of eight pansets is supplied to each shelf of the rack type proofer P and will be discharged from the proofer P onto the conveyor 10. So that the pansets will remain in groups, without the need for pan stops or a grouping conveyor in the transfer operation, the length of conveyors 10–13 is substantially or generally the same.

It will be assumed initially that the first eight pansets of the particular cycle are in position on the conveyor 10, which is operating to move them forwardly toward conveyor 11, inasmuch as motor coil 11a is energized and contacts 11a–1 in circuit line f are closed. With conveyors 11–13 empty, the normally closed limit switch contacts LS–1b are closed and motor coil 11a of the motor which drives conveyor 11 is also energized. Likewise, motor coil 12a in circuit line c is energized because the normally closed contacts LS–3a of limit switch LS–3 are closed, and the coil 13a in circuit line b of the motor driving conveyor 13 is also energized because the normally closed contacts LS–2b of limit switch 2 are closed.

The conveyor 11 is driven at a faster speed than conveyor 10 because it is desired to provide a greater space between the pansets to facilitate lidding at a lidding station opposite conveyor 11. Once lidding is accomplished, it is desired to decrease the space between the pansets until they are in engagement, and accordingly the conveyor 12 is driven at a considerably lower speed. Finally, conveyor 13 is driven at a faster speed than conveyor 12 to space out the pansets the desired distance to achieve proper color uniformity in the baking operation. For example, conveyor 10 may be driven at 65 feet per minute, conveyor 11 at 75 feet per minute, conveyor 12 at 55 feet per minute, and conveyor 13 at 60 feet per minute. Other speeds are, of course, possible and it is to be understood that these speeds are mentioned only as illustrative of speeds which may be employed. The speed of operation of the proofer discharge sweep and the oven loading member must, of course, be correlated with the speeds of the interrelated conveyors.

When the leading pansets of the panset group actuate limit switch LS–1, the normally open contacts LS–1a in circuit line d are closed and the relay coil TD is energized. At the same time, the normally closed contacts LS–1b are opened. When the limit switch contacts LS–1a are closed, energization of the relay coil TD causes the normally closed contacts TD–1 to open at the same time that contacts LS–1b are opened and motor coil 11a is therefore deenergized so that conveyor 11 stops, and during the prescribed time delay interval, lidding can take place. Of course, lidding may be accomplished manually or automatically, as desired. The timer may be a conventional timer, model 9050–ROID, manufactured by Square D Company of Milwaukee, Wisconsin, U.S.A., wherein the time delay occurs after the contacts TD–1 are opened and when the timer times out, contacts TD–1 are closed and coil 11a is energized so that the conveyor 11 moves forwardly once again. During the time that the conveyor 11 is halted for the lidding operation and coil 11a is deenergized, the contacts 11a–1 in circuit line f are opened so that coil 10a is deenergized and the operation of conveyor 10 is also halted.

When the first group of pansets reaches the limit switch LS–3, the normally open contacts LS–3a are opened. However, since the motor coil 13a is energized and contacts 13a–1 remain closed, the conveyor 12 is not stopped and the pansets proceed on to conveyor 13. The first group of pansets continues to move onto conveyor 13 until the foremost panset engages and actuates limit switch LS–2. When this occurs the normally closed contacts LS–2b of limit switch LS–2 in circuit line b are opened and coil 13a of the motor which drives conveyor 13 is deenergized so that the conveyor 13 stops. At the same time, the normally open contacts LS–2a of limit switch LS–2 in circuit line a are closed and the coil 14 which controls the operation of the oven loader is energized to start the loading operation and sweep the pansets from the conveyor 13 into the oven O. Desirably, a mechanically operated, normally open limit switch indicating that the particular oven tray is in position to be loaded is provided in the circuit line a as a safety measure. However, it is not shown in the drawings since it forms no part of the present invention.

When limit switch LS–2 is actuated and the motor coil 13a is deenergized, the motor contacts 13a–1 open. However, motor coil 12a will not be deenergized until a second group of pansets has moved onto the conveyor 12 and limit switch LS–3 is actuated to open the normally closed contacts LS–3a in circuit line g. Thus, limit switch LS–3 prevents pansets from conveyor 12 from moving onto the conveyor 13 during the loading operation, when pansets are in engagement with limit switch LS–2. When limit switch LS–2 is freed by the oven loader moving the pans from conveyor 13 into the oven, the conveyor 13 is started once again and the pans are free to move from the conveyor 12 onto the conveyor 13 once again because contacts 13a–1 close. In the operation of the system a group of pansets will normally be in position on each of the conveyors 10–13 or moving into position thereon. The speeds of operation of the conveyors 10–13 and the unloading apparatus of the proofer and loading apparatus for the oven are correlated with the time required for lidding so that a full group of pansets is in loading position on the conveyor 13 by the time a conveyor tray of the continuously traveling oven conveyor is in position to be loaded.

It will be seen that the limit switch LS–2 functions to stop the conveyor 13 and to energize the oven loader. At the same time, it operates to halt conveyor 12 at a time when pansets are in contact with limit switch LS–3 so that the immediately succeeding group of pansets will not be fed onto conveyor 13 until the oven loader clears conveyor 13 and conveyor 13 is again operative. Limit switch LS–1, when actuated, functions to stop the conveyors 10 and 11 while at the same time, assuming the conveyor 12 is in operation, operating a timer insuring that the conveyor 11 is stopped only for the requisite time to accomplish lidding. If a shelf of a rack in the proofer should be empty, as when the pansets are not being supplied to the proofer P at an adequate rate, the storage conveyors 11 and 12 permit the system to compensate in the sense that they will provide groups of pansets to fill the trays of the oven O. In the event groups of pansets should back up onto conveyor 10, as when the oven O is running at too slow a speed for the proofer system and the conveyor 10 is stopped, the motor coil 15 of the motor driving the proofer unloading element will be halted by the phototube 16 until the pansets on conveyor 10 move off onto conveyor 11.

Variations of the system shown in FIGURE 1 are possible without departing from the scope of the invention. For instance, if it is not desired to perform a lidding operation the time delay element, including its coil TD and contacts TD–1, and the limit switch contacts LS–1a, could be eliminated. Of course, the path to the oven could be circuitous in the sense that turns could be used, the only consideration being that the steps in the path from the proofer to the oven be approximately equal.

In FIGURE 3, a modification of the system is disclosed wherein the proofer P' is of the type shown in Patent No. 3,101,143 and the oven O' is a tunnel type oven including an endless conveyor surface 26 trained around sprocket drum members 27 at its ends which conveys the pansets from one end of the oven O' to the other. It will be observed that the same numbers have been assigned to like elements in FIGURE 3, except that they have been primed. The basic electrical control system shown diagrammatically in FIGURE 2 may be used for operating the system shown in FIGURE 3 and will remain substantially the same, except that there need be no time delay means for halting one of the conveyors for a lidding operation.

In FIGURE 3 the downwardly traveling chain 28 mounting spaced apart trays 29 on which the pansets are carried through the proofer P' delivers the pansets to the endless conveyor 11' and the pansets proceed on to the conveyor 12' and conveyor 13', as before. The endless conveyor 30, which functions along with conveyor 11', as an unloader, is mechanically coupled to the conveyor 11', and may be driven by the same motor which drives the conveyor 11'. Also, separate motors drive the conveyors 12' and 13' and the oven loader member 31 which comprises an endless chain member 32 having dependent pusher members 33 which push the pansets from the conveyor 13' to a shelf 34 which bridges the space between the conveyor 13' and the conveyor 26 of the oven O'. As noted, the basic electrical system of FIGURE 2 may be used, it being assumed that the circuit line $d$ and circuit line $f$, and the components connected therein, are eliminated. In addition, contacts TD–1 should be eliminated from circuit line $j$. Otherwise, the circuit may remain the same and the operation of the circuit remains the same.

Instead of limit switches LS–1, LS–2, and LS–3, phototubes may be used. In FIGURE 3, whether the elements are limit switches or phototubes, the designations LS–2', LS–3' and LS–1' are used to identify them.

As before, the element LS–2' has normally closed contacts LS–2b, in circuit line $b$ and normally open contacts LS–2a in circuit line $a$. The starter coil 13a of the motor driving conveyor 13' is connected in circuit line $b$, as before, and normally open contacts 13a–1 in circuit line $h$ are associated therewith, as before. The element LS–3' has normally closed contacts LS–3a in circuit line $g$, as previously, and the starter coil 12a for the motor driving conveyor 12' is in circuit line $c$, as before. In line $j$ there similarly are normally open contacts associated with the coil 12a designated 12a–1. The element LS–1' has normally closed contacts LS–1b in circuit line $i$ and the starter coil 11a of the motor driving conveyor 11', which is in circuit line $e$, has associated normally open contacts 11a–1 in circuit line $f$, as previously. The motor for driving the conveyor 31 may be presumed to have a starter coil 14 in circuit line $a$.

Since the circuit diagram remains essentially the same and the operation of the various elements in the circuit diagram remains the same, it is unnecessary to again describe the operation of the system. A phototube 16' may be employed to halt the motor driving chain 28, whose starting coil may be designated 15 in circuit line $k$, if the pansets have not cleared the unloading area by the time the next tray 29 moves downwardly to the unloading position. Seeding of the product may be accomplished by the mechanism 35 at the rear end of the conveyor 12', as shown.

The system described in FIGURE 3 is particularly suited to rolls and can handle the higher production rates. Another advantage of this direct row transfer system is that less space need be used for transfer of the products from the proofer to the oven, or from the oven to the cooler in the event a similar system is employed between the oven and the cooler. For equivalent product rates, slower conveyor speeds may be used in the system disclosed in FIGURE 3.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:
1. In a bakery apparatus; bakery processing units for performing operations on panned farinaceous products; first conveyor means including a traveling portion on which the products are received from one of the units; means for driving said traveling portion; second conveyor means including a traveling portion for receiving and transferring products from said first conveyor means; means for driving said traveling portion of said second conveyor means at a predetermined slower speed than said first conveyor means to cause the panned products to move into end-to-end engagement; third conveyor means, adjacent said second conveyor means, having at least a portion adjacent the other unit, and including a traveling portion for receiving the panned products from said conveyor means and advancing them along the third conveyor means; and means for driving said traveling portion of said third conveyor means at a predetermined speed faster than said traveling portion of the second conveyor means to space said products one from the other a predetermined distance, said first conveyor means including a pair of in-line endless conveyors, the second of which is driven at a faster speed than the first to space the products on the second a greater distance apart to permit the placement of lids on the pans containing the products.

2. The combination defined in claim 1 in which said second conveyor means comprises an endless conveyor and said traveling portion comprises the endless product receiving surface thereof.

3. The combination defined in claim 1 in which said third conveyor means comprises an endless conveyor and said traveling portion comprises the endless product receiving surface thereof.

4. Conveying apparatus for conveying proofed dough in pans; proofer and oven units; electrical circuit means including a power source; a first endless conveyor means adjacent the proofer unit and upon which the dough products are received from the proofer; first drive control means in said circuit means for causing driving of said first conveyor means; second endless conveyor means including an incorporated endless conveyor moving at a slower speed than said first endless conveyor means; second drive control means in said circuit means for causing driving of said incorporated endless conveyor at a slower speed than said first endless conveyor means to bunch the pans thereon; third endless conveyor means including a portion extending adjacent the oven unit for receiving said pans from said incorporated endless conveyor; third drive control means in said electrical circuit means for causing driving of said third endless conveyor means at a faster rate of speed than said incorporated endless conveyor to respace the successive pans traveling on said third endless conveyor means; first switch means positioned to be actuated when pans are moved to a predesignated position on said third conveyor means adjacent the oven unit; said switch means actuating contacts in said circuit means in series with said third drive control means to disable said third conveyor means and actuating other contacts in series with said second drive control means to disable said second conveyor means when pans are moved to a predesignated position thereon; and second switch means positioned to be actuated when pans are moved to said predesignated position on said second endless conveyor means; actuation of said second switch means causing actuation of contacts in said circuit means in series with said first drive control means to disable said first conveyor means.

5. The combination defined in claim 4 in which additional switch means is positioned to be actuated when pans are moved to a predesignated position at the terminal end of said incorporated endless conveyor; said additional switch means actuating contacts in said circuit means in parallel with the said contacts in series with the second drive control means to disable the circuit to said second drive control means.

6. The combination defined in claim 5 in which said second conveyor means includes an endless conveyor between said first conveyor means and incorporated endless conveyor opposite a lidding station; additional drive control means for said endless conveyor opposite the lidding station; said second switch means actuating contacts in series with said additional drive control means to disable a circuit to said additional drive control means; and said second switch means also actuating time delay contacts to hold said additional drive control means out of operation for a time interval adequate to permit lidding.

7. In a bakery system; proofer means; oven means; and conveying apparatus for conveying proofed dough in pans between said proofer and oven means comprising: electrical circuit means including a power source; a first endless conveyor means including a portion adjacent the proofer unit and upon which the dough products are received from the proofer; a first circuit line in said circuit means having first drive control means for causing driving of said first conveyor means; second endless conveyor means including an incorporated endless conveyor moving at a slower speed than said first endless conveyor means; a second circuit line in said circuit means having second drive control means for causing driving of said incorporated endless conveyor at a slower speed than said first endless conveyor means to bunch the pans thereon; third endless conveyor means including a portion extending adjacent the oven means for receiving said pans from said incorporated endless conveyor; a third circuit line in said circuit means having third drive control means for causing driving of said third endless conveyor means at a faster rate of speed than said incorporated endless conveyor to respace the successive pans traveling on said third endless conveyor means; first sensing means positioned to be actuated when pans are moved to a predesignated position on said third conveyor means adjacent the oven means having normally closed contacts in said third circuit line; contact means actuated when said third drive control means is operated connected in said second circuit line; second sensing means positioned to be actuated when pans are moved to a predesignated position on said incorporated endless conveyor means having normally closed contacts in said second circuit line in parallel with said contact means; and means in said first circuit line in series with said first drive control means for disabling said first drive control means.

8. The combination defined in claim 7 in which said second conveyor means includes an endless conveyor between said first conveyor means and incorporated endless conveyor opposite a lidding station; a fourth circuit line having additional drive control means for said last mentioned endless conveyor opposite the lidding station; fourth switch means positioned to be actuated when pans reach a designated position on said last mentioned endless conveyor having normally closed contacts in series with said additional drive control means to disable a circuit to said additional drive control means; said fourth switch means also actuating time delay contacts in said fourth circuit line parallel to said last mentioned normally closed contacts to hold said additional drive control means out of operation for a time interval adequate to permit lidding.

9. The combination defined in claim 7 in which the oven means includes a loader means and an additional circuit line in said circuit means includes a drive control element for operating the loader means; said first switch means having normally open contacts in said additional circuit line.

10. In bakery apparatus; bakery processing units for performing operations on panned farinaceous products; first conveyor means on which the products are received from one of the units; second conveyor means including a traveling portion for receiving and transferring products from said first conveyor means; means for driving said traveling portion of said second conveyor means at a predetermined slower speed than said first conveyor means to cause the panned products to move into end-to-end engagement; third conveyor means, including a traveling portion for receiving the products from said second conveyor means and advancing them along the third conveyor means; and means for driving said traveling portion of said third conveyor means at a predetermined speed faster than said traveling portion of the second conveyor means to space said products one from the other a predetermined distance; said first conveyor means including a pair of conveyors, the second of which is an endless conveyor driven at a faster speed than the first to space the products on the second a greater distance apart.

11. In a bakery system; bakery processsing units for performing operations on panned farinaceous products; electrical circuit means including a power source; a first conveyor means including a portion adjacent one of the units and on which a plurality of successive panned farinaceous products are received from the said unit; said first conveyor means including a traveling portion for receiving panned products; a first circuit line in said circuit means having means for causing driving of said traveling portion for transferring products thereon; second conveyor means including an incorporated traveling portion for receiving panned products moving at a slower speed than said first conveyor means; a second circuit line in said circuit means having means for causing driving of said traveling portion incorporated in the second conveyor means at a slower speed than said first conveyor means to bunch the successive panned products thereon; third conveyor means including a portion extending toward a second bakery processing unit, said third conveyor means incorporating a traveling portion on which panned products are received; a third circuit line in said circuit means having means for causing driving of said traveling portion incorporated in said third endless conveyor means at a faster rate of speed than said traveling portion incorporated in said second conveyor means to respace the successive panned products traveling on said third conveyor means; sensing means positioned to be actuated when panned products are moved to a predesignated position on said third conveyor means for disabling the travel of said traveling portion incorporated in the third conveyor means; sensing means positioned to be actuated when panned products are moved to a predesignated position on said second conveyor means and connected in said circuit means for disabling the travel of said traveling portion incorporated in the second conveyor means when the traveling portion incorporated in said third conveyor means is disabled; and means connected to disable the means causing driving of said traveling portion of the first conveyor means when the traveling portion incorporated in the second conveyor means is disabled.

12. In a bakery system; bakery processing units for performing operations on panned farinaceous products; electrical circuit means including a power source; a first conveyor means including a portion adjacent one of the units and on which a plurality of successive panned farinaceous products are received from the said unit; said first conveyor means including a traveling portion; a first circuit line in said circuit means having means for causing driving of said traveling portion for transferring products; second conveyor means including a traveling portion for transferring panned products; a second circuit line in said circuit means having means for causing driving of said traveling portion included with said second conveyor means; third conveyor means including a portion extending toward the second bakery processing unit, said third conveyor means including a traveling portion for transferring panned products; a third circuit line in said circuit means having means for causing driving of said traveling portion included with said third endless conveyor means; sensing means positioned to be actuated when panned products are moved to a predesignated position on said third conveyor means for disabling the travel of said traveling portion included with the third conveyor means;

sensing means positioned to be actuated when panned products are moved to a predesignated position on said second means and connected in said circuit means for disabling the travel of said traveling portion included with the second conveyor means when the traveling portion included with said third conveyor means is disabled; and sensing means connected to disable the means causing driving of said traveling portion included with said first conveyor means when the traveling portion included with the second conveyor means is disabled.

13. The combination defined in claim 12 in which said third conveyor means includes a support member leading to said other unit and a loader moving in the same direction of travel as the traveling portion included with the third conveyor means is operated to move panned products off said third conveyor means to said other unit.

References Cited by the Examiner

UNITED STATES PATENTS

| 1,457,353 | 6/1923 | Dreher _____ 198—34 X |
| 3,250,375 | 5/1966 | Bonthuis et al. _____ 198—34 |

FOREIGN PATENTS

| 215,897 | 7/1958 | Australia. |

WALTER A. SCHEEL, *Primary Examiner.*

J. SHEA, *Assistant Examiner.*